Dec. 30, 1941.          H. THOMASON          2,268,354
                      ADJUSTABLE PIN GAUGE
                      Filed Dec. 27, 1938          2 Sheets-Sheet 1
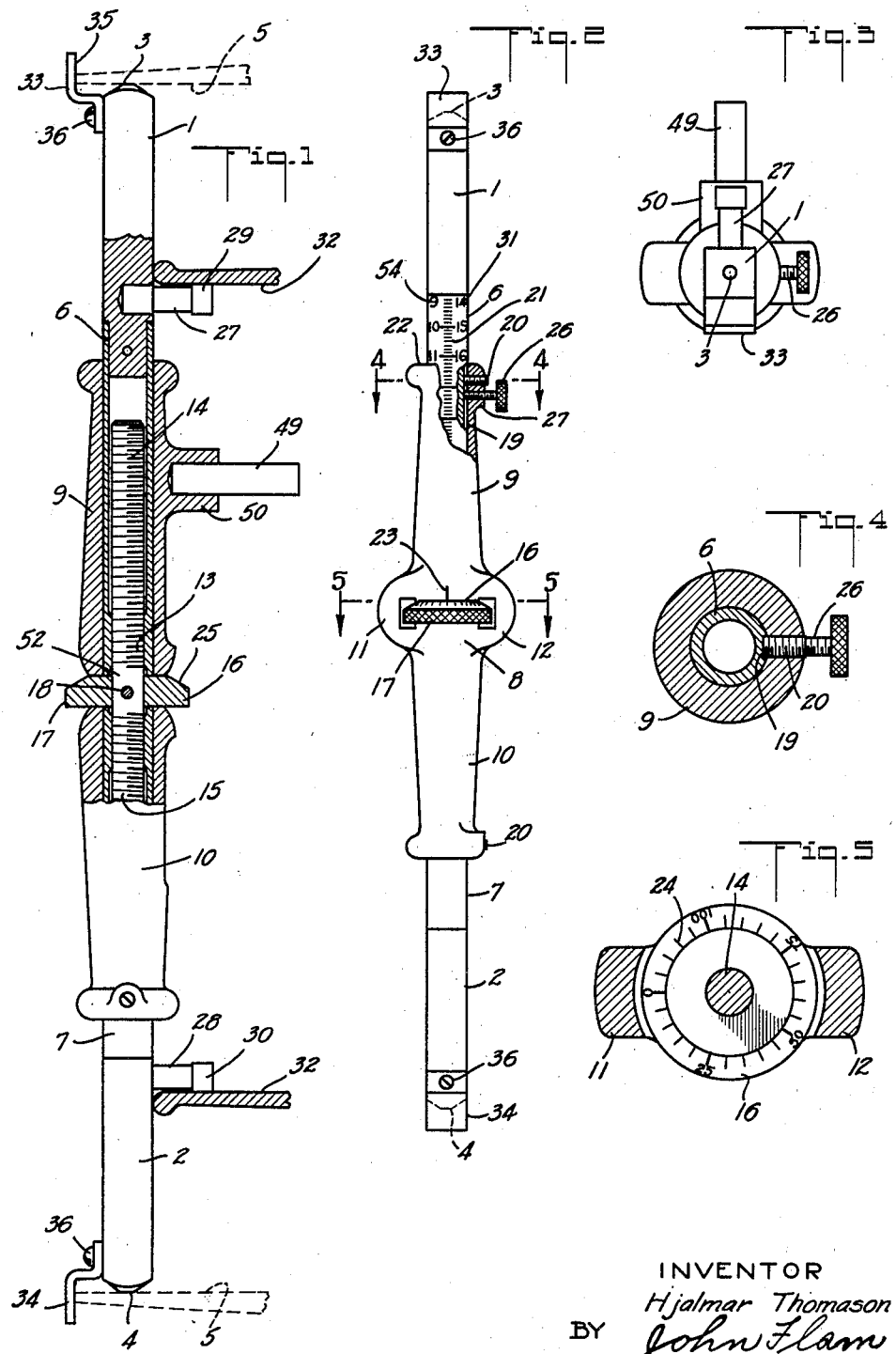
INVENTOR
Hjalmar Thomason
BY John Flam
ATTORNEY Dec. 30, 1941.   H. THOMASON   2,268,354
ADJUSTABLE PIN GAUGE
Filed Dec. 27, 1938   2 Sheets-Sheet 2
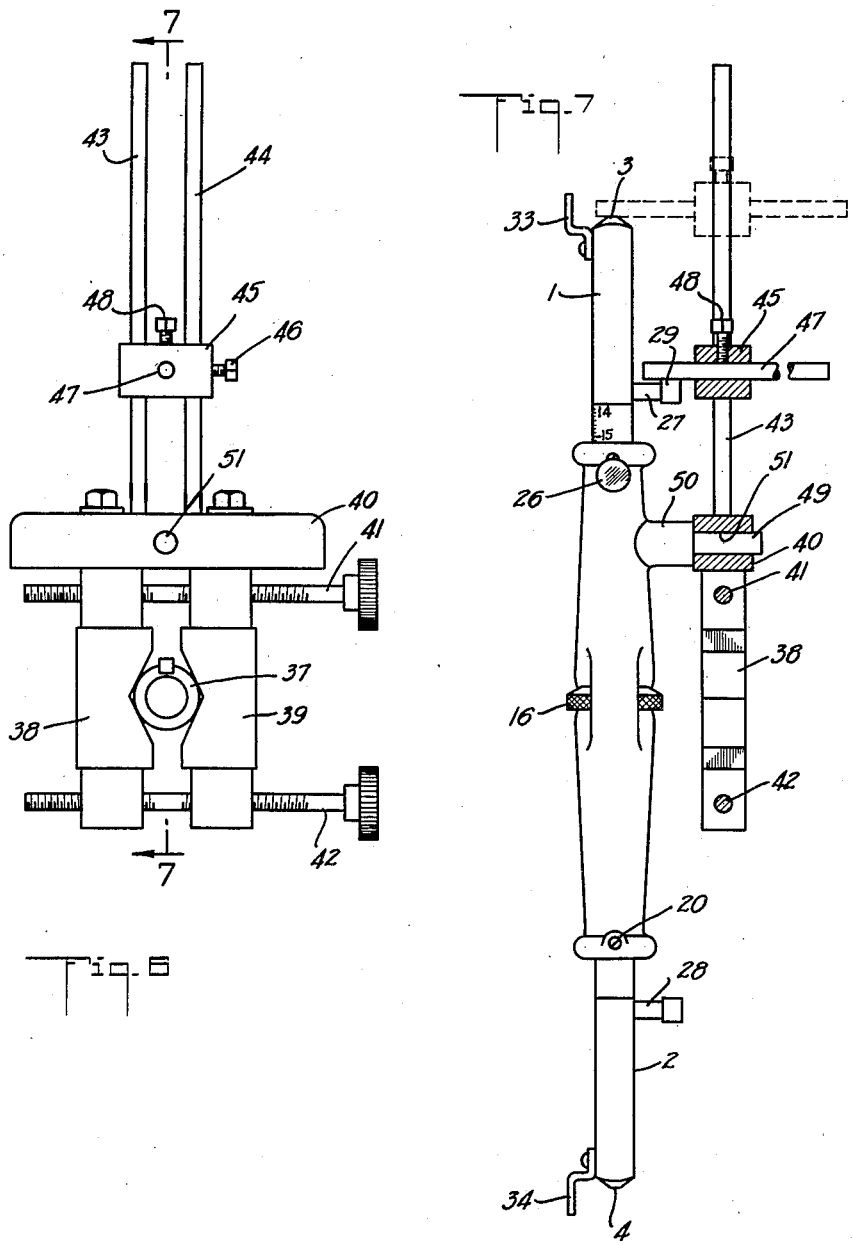
INVENTOR
Hjalmar Thomason
BY John Flam
ATTORNEY Patented Dec. 30, 1941

2,268,354

UNITED STATES PATENT OFFICE 2,268,354

ADJUSTABLE PIN GAUGE

Hjalmar Thomason, Los Angeles, Calif.

Application December 27, 1938, Serial No. 247,774

6 Claims. (Cl. 33—180)

This invention relates to a pin gauge, and particularly to one that may be adjusted to a desired size between limits.

It is one of the objects of this invention to make it possible to extend the limits between which such a gauge may be set.

It is another object of this invention to make it possible to set the gauge by minute measured increments, and yet by the aid of a simple structure. Thus the gauge may be used as a micrometer measuring instrument.

Although the utility is by no means to be limited to any specific use, one field of utility thereof is in connection with automobile brake drums, and with apparatus for reconditioning the drums and the cooperating shoes. In this connection, machinery has been devised for appropriate rotary support on a wheel axle for grinding or machining the exterior cylindrical faces of the shoes that are intended to cooperate with an internal surface of a brake drum. By the aid of the present invention, it is possible to transfer the pin gauge measurement of the internal diameter of the drum to a feeler gauge for testing the external diameter of the shoes.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is an elevation, partly in section, of a pin gauge embodying the invention, the gauge being shown in use;

Fig. 2 is a side elevation of the pin gauge shown in Fig. 1, a part of it being broken away;

Fig. 3 is a top plan view thereof;

Figs. 4 and 5 are enlarged sectional views taken respectively along planes 4—4 and 5—5 of Fig. 2;

Fig. 6 is an elevation of a gauging device that may be utilized in connection with the pin gauge; and Fig. 7 is a side elevation of the device shown in Fig. 6 in use with the pin gauge.

The pin gauge in general involves a pair of pin bars 1 and 2. These pin bars have gauging surfaces 3 and 4 at opposite ends of the gauge. The bars are coaxial and are arranged to be adjusted by mechanism hereinafter to be described, so as to vary the distance between the gauge surfaces 3 and 4.

As is well understood, these gauging surfaces are intended to be utilized in connection with an interior diametrical surface such as the surface 5 illustrated in Fig. 1. This surface may represent the internal diameter of a brake drum or the like.

Both of these pin bars 1 and 2 are shown as having a square extremity. To each of these is attached a cylindrical sleeve member 6 or 7, extending toward each other. These cylindrical sleeve members are arranged to be guided for axial movement in a frame structure 8. This frame structure 8 has oppositely directed guiding members 9 and 10, accurately aligned coaxially with the pin bars 1 and 2, and provide an accurate sliding fit for the external diameter of the sleeve extensions 6 and 7. The inner ends of these guides are shown as spaced apart slightly for a purpose to be hereinafter described. The guide members 9 and 10 however, are integrally joined as by the yokes 11 and 12 (Figs. 2 and 5).

Near the inner ends of the sleeves 6 and 7 they are interiorly threaded, as indicated at 13, for engagement with oppositely extending portions 14 and 15 of an adjusting screw 52. This adjusting screw is provided with right and left threads, so that rotation of the screw 52 in one direction will cause the gauging surfaces 3 and 4 to draw inwardly; and when the screw 52 is rotated in the opposite direction, these gauging surfaces will advance outwardly.

For appropriate rotation of the screw member 52, use is made of an operating wheel 16. This operating wheel 16 is preferably located between the adjacent inner ends of the guide members 9 and 10. It may be fastened to the screw member 52 as by the aid of a cross pin 18. The operating wheel 16 is also preferably provided with an exterior cylindrical surface 17 which may be knurled for facilitating digital manipulation.

In order to restrain the pin bar structures from rotating and thereby to constrain them to move in an axial direction, a spline arrangement is provided. Thus for example as shown most clearly in Figs. 2 and 4, each sleeve 6 and 7 is provided with a longitudinal spline groove 19, into which groove extends the end of a transverse screw 20 threaded into the outer edge of the guide members 9 and 10. While screws 20 permit axial adjustment of the pin gauge bars 1 and 2, they effectively prevent relative rotation of these bar members with respect to the guides 9 and 10.

The distance between the gauging surfaces 3 and 4 may be indicated by the provision of a scale. Thus for example scale marks 21 and indicia may be provided on one of the sleeves 6 and are adapted to cooperate with the top edge 22 of the corresponding guide member 9. These markings may form scale divisions of one-eighth of an inch apart or the like. They may be appropriately engraved or otherwise produced on the sleeve surface.

In order to obtain finer subdivisions, use is made of an index mark 23 (Fig. 2) carried at the lower end of one of the guide members 9, and cooperating with scale markings 24 disposed on the bevel surface 25 of the operating wheel 16. The subdivisions of this circular scale on tapered surface 25 comprise intermediate divisions with respect to the divisions in the scale 21, so that fine measurements, as for example to the hundredths or thousandths of an inch may be read with facility.

After the gauge has been once set, a clamping screw 26 (Figs. 2 and 4) may be used to clamp the pin gauge in adjusted position. This clamping screw 26 passes radially to the gauge axis through a boss 27 adjacent the top edge of one of the guide members 9.

The limits of measurement by the aid of the gauging surfaces 3 and 4 are determined by the amount of permitted axial movement of the bars 1 and 2. In order to supplement this range, and to make it possible to gauge smaller internal diameters than permitted by surfaces 3 and 4, a supplemental gauging structure forming stepped gauging surfaces is provided, which will now be described.

Thus each pin bar 1 and 2 is provided with a laterally extending gauging pin 27 or 28. The axes of these pins are truly perpendicular to the longitudinal axis of the gauge and are formed with enlarged cylindrical ends 29 and 30. These cylindrical ends form supplemental gauging surfaces spaced a fixed distance away from the gauge surfaces 3 and 4. In the present instance these gauge surfaces are each respectively separated by a distance of two and one-half inches from the corresponding gauging surfaces 3 and 4. Thus it is possible by supplemental indices 54 shown in Fig. 2 to determine the setting of the gauge with respect to the gauging surfaces 29 and 30. It is seen in Fig. 2 that there is a five inch differential between the left hand indices 54 and the right hand indices 31. The right hand indices 31 thus corresponds to the separation of the gauging surfaces 3 and 4, while the indices 54 correspond to the separation of the gauge surfaces 29 and 30. In Fig. 1 the gauge surfaces 29 and 30 are shown as in use in connection with an internal diametric surface 32, such as of a brake drum.

Thus the range or limit of operation of the pin gauge is extended by the aid of the transverse pins 27 and 28, which are rigidly supported respectively in the pin bars 1 and 2.

To facilitate measurement with the surfaces 3 and 4, use may be made of the stop members 33 and 34. Each of these stop members has a surface such as 35 laterally spaced from the corresponding gauging surfaces and extending beyond this gauging surface. These stops may rest against the outer edge of the drum being measured during the process of measurement. They may be attached to the bars 1 and 2 as by the aid of screws 36. When it is not desired to use the stop members, the screws may be loosened and the stop members rotated out of the way.

After an internal diameter has been gauged by the pin gauge either by the aid of surfaces 3—4 or 29—30, it is often desirable that this measurement be transferred to an external feeler gauge. Such a feeler gauge is illustrated as combined with a device illustrated in Figs. 6 and 7.

For example, in using the gauge for the measurement of internal brake drum diameters, the measurement thus made may be utilized for gauging the external diameter of the cooperating brake shoes. Ordinarily the wheels with which the brake shoes are associated are provided with axles, and the feeler gauge may appropriately be supported upon these axles for rotation about the axis of the wheel in the use of the feeler gauge.

Thus for example in Fig. 6 such an axle 37 is indicated, adapted to be engaged by the blocks 38 and 39, having V-shaped seats for the accommodation of the axle 37. An appropriate frame structure 40 may be provided for these blocks 38 and 39, which blocks may be expanded or contracted as by the thumb screws 41 and 42, to accommodate different sizes of axles.

Above the frame 40 are located a pair of truly parallel guide bars 43 and 44. These bars serve as guides for a gauge block 45 appropriately apertured for the reception of the bars 43 and 44. The block 45 may be set at any desired height by the aid of the set screw 46. The block 45 carries a feeler gauge bar 47 having an axis truly perpendicular to the axis of the axle 37. This bar 47 may be adjusted axially and maintained in axial position as by the aid of the set screw 48.

In using the pin gauge structure illustrated in Fig. 1, to set the feeler gauge bar 47, the pin gauge structure must be supported on the device shown in Fig. 6 so that the gauging surface 3 will be at the same distance from the axis of axle 37 as when the measurement of the internal diameter was made. This might possibly be accomplished by providing the pin gauge with a transverse axis truly perpendicular to the axis of bars 1 and 2, and also truly to the axis of the drum being gauged. Then the pin gauge axis would be supported on the gauging device of Fig. 6 so as to coincide with the axis of axle 37. However, this is not feasible, without a rather complicated structure. By the aid of the present invention, this kind of an arrangement is very simply obviated.

Accordingly there is utilized in the present instance a stub shaft 49 for the pin gauge (Figs. 1, 3 and 7), appropriately supported in a transverse boss 50 provided on the guide 9. This stub shaft has an axis truly perpendicular to the axis of the gauge, but is offset from the axis of the drum being measured. This stub shaft serves as a support for the pin gauge on the device illustrated in Fig. 6, by the aid of the aperture 51 in frame 40. This aperture 51 provides an accurate fit for the stub shaft 49. Its axis is in exact alinement with the line joining the center of the axle 37 and the center of the feeler gauge 47. Its distance from the axis of axle 37 is also made the same as the distance of the axis of stub shaft 49 from the axis of the drum that was gauged. There is no mechanical difficulty in ensuring such accurate alinement and spacing. After the pin gauge is set to gauge an internal diameter of a brake drum, its stub shaft 49 can be inserted in the aperture 51. Thereupon the block 45 can be moved along the guides 43 and 44 until the feeler gauge 47 cooperates with the gauge surface 3 or gauge surface 29. By virtue of the fact that the feeler gauge bar 47 can be moved axially, there is no difficulty in causing it to cooperate with either of these two surfaces. In the position shown in full lines or in dotted lines in Fig. 7, the pin gauge structure can be swung about the axis of the stub shaft 49 while the block 45 is adjusted to cause feeler gauge 47 to correspond to the cooperating gauging surface of the pin gauge. Thereafter the pin gauge structure may be removed and the feeler gauge used in the well known manner for gauging the external diameter of the brake shoes or the like, intended to cooperate with the gauged internal diameter.

What is claimed is:

1. In an adjustable pin gauge, a guide frame having a pair of oppositely directed coaxial guiding extensions, pin bars axially movable in said extensions, and having end gauging surfaces, and a stub shaft carried by one of the guiding extensions and having an axis perpendicular to the bar axis for swingingly supporting said gauge about a center spaced from the mid-point of the gauge.

2. In an adjustable pin gauge, a guide frame having a pair of oppositely directed coaxial guiding extensions, and a pin bar axially movable in each of said extensions, each of said bars having means forming stepped gauging surfaces thereon, said means including a gauging surface at the end of the bar, as well as a pin carried by the bar and extending transversely thereto, said pin having a cylindrical gauging surface.

3. In an adjustable pin gauge, a guide frame having a pair of oppositely directed coaxial guiding extensions, and a pin bar axially movable in each of said extensions, each of said bars having means forming a pair of gauging surfaces thereon separated by a fixed distance along the bar, a threaded member engaging said bars for adjusting them by equal and opposite amounts, one of said bars and said frame having cooperating means forming an indicator with graduations corresponding to each of said gauge surfaces and indicating the settings respectively of cooperating surfaces of each of said pairs, and an operating member carried by the threaded member, said operating member and the frame having cooperating scale marks for obtaining readings intermediate said graduations.

4. In an adjustable pin gauge, a guide frame having a pair of oppositely directed coaxial guiding extensions, and a pin bar axially movable in each of said extensions, each of said bars having means forming a pair of gauging surfaces thereon separated by a fixed distance along the bar, said means including a gauging surface at the end of the bar, and a pin carried by the bar and extending transversely thereto, said pin having a cylindrical gauging surface, a threaded member engaging said bars for adjusting them by equal and opposite amounts, one of said bars and said frame having cooperating means forming an indicator with graduations corresponding to each of said gauge surfaces and indicating the settings respectively of cooperating surfaces of each of said pairs, and an operating member carried by the threaded member, said operating member and the frame having cooperating scale marks for obtaining readings intermediate said graduations.

5. In an adjustable pin gauge for measuring the diameter of a cylindrical surface, means forming alined gauging surfaces and a pivotal support for the gauge and carried by the gauge, said support having a cylindrical surface having an axis spaced from the mid point between the alined gauging surfaces and parallel to the axis of the cylindrical surface being measured.

6. In an adjustable pin gauge for measuring the diameter of a cylindrical surface, means forming alined gauging surfaces, means for adjusting the distance between said gauging surfaces, and a pivotal support for the gauge and carried by the gauge, said support comprising a pin having an axis parallel to the axis of the cylindrical surface and closer to one of the gauging surfaces than to the other of said gauging surfaces.

HJALMAR THOMASON.